United States Patent [19]

Maeda

[11] Patent Number: 4,699,412
[45] Date of Patent: Oct. 13, 1987

[54] LIFTING APPARATUS

[75] Inventor: Koichi Maeda, Toyota, Japan

[73] Assignee: Toyota Jidosha Kabushiki Kaisha, Toyota, Japan

[21] Appl. No.: 839,209

[22] Filed: Mar. 13, 1986

[51] Int. Cl.$^4$ .............................................. B66C 1/02
[52] U.S. Cl. ..................................... 294/64.1; 294/65
[58] Field of Search ................. 294/64.1, 65; 414/627, 414/723; 271/90, 91, 107; 264/335; 269/21

[56] References Cited

U.S. PATENT DOCUMENTS 3,033,382  5/1962  Noble et al. ........................... 294/65
4,571,320  2/1986  Walker ................................... 294/65

FOREIGN PATENT DOCUMENTS 632564  6/1977  U.S.S.R. .............................. 294/64.1

Primary Examiner—James B. Marbert
Attorney, Agent, or Firm—Cushman, Darby & Cushman

[57] ABSTRACT

A workpiece lifting apparatus for carrying workpieces into and out of a die in a press machine. A work support portion of the lifting apparatus comprises vacuum cups which reduce impacts caused when the workpiece is set in and detached from the die so as to prevent deformations of the workpiece and to stabilize the setting position of the same.

5 Claims, 4 Drawing Figures

LIFTING APPARATUS

BACKGROUND OF THE INVENTION

1. Field of the Invention

The present invention relates to an auxiliary apparatus used in pressing work, and more particularly to a lifting apparatus for transporting material into a die in a press machine and for taking a product out of the die.

2. Description of the Prior Art

Throwing or carrying machines are commonly employed as a substitute for human labor in transporting objects such as material or semi-processed goods into a press die and in taking the object workpiece out of the die after each press work is finished. This kind of machine generally consists of two components, namely, a lifting apparatus for supporting and moving an object in up-and-down fashion and an apparatus for moving the lifting apparatus in the horizontal direction to position the workpiece within a press die and to remove it therefrom. Such a lifting apparatus commonly has arm portions for supporting a workpiece which is transferred from the preceding step. After the press work step is completed, the arm portions lift up and support the workpiece. If, as has been the case in the prior art, the arm portions are made of a specific material such as metal alone, the workpiece may be damaged, since the workpiece is unstable relative to the supporting arm, and can slip and be deformed from resulting impacts. Attempts have been made to attach rubber rollers to enable the arm portions to securely receive workpieces with the assistance of frictional force of rubber acting on the same. However, the ability of rubber rollers to perform this function is generally not sufficient to satisfactorily stabilize workpieces and prevent their deformations.

SUMMARY OF THE INVENTION

An object of the present invention is to provide a lifting apparatus having arm portions to which cups made of elastic material are attached.

Another object of the present invention is to provide a lifting apparatus in which the cups are attached in the vicinity of the arm portions.

These cups are made of an elastic material and are designed to absorb the impact when a workpiece is being positioned thereon, and to accommodate the workpiece in conformity with its shape, as well as to provide a similar effect when the workpiece is taken out of the press die.

DETAILED DESCRIPTION OF THE PREFERRED EMBODIMENTS

Figure 1:
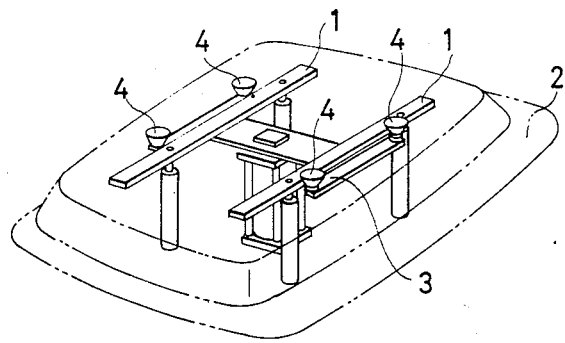
FIG. 1 is a first embodiment of the perspective view of a lifting apparatus according to the present invention.
Figure 2:
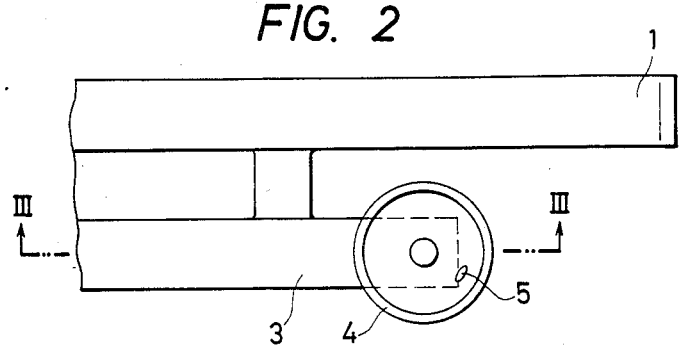
FIG. 2 is a plan view of the main part.
Figure 3:
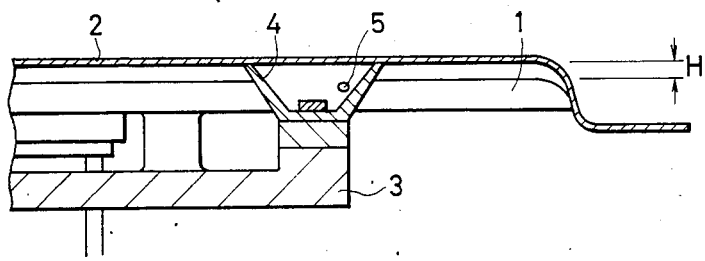
FIG. 3 is a cross-sectional view taken along a line II—II of FIG. 2.

A first embodiment of the present invention will be described with reference to FIGS. 1 to 3. FIG. 1 shows, in perspective, a lifting apparatus installed in the vicinity of a press machine. An apparatus for transferring and for inserting and taking out an object from the press machine is well known in the art, and is not described here. Numerals 1,1 denote arms of the lifting apparatus which are for directly supporting a workpiece 2 that is to be processed. Vacuum cups 4 are attached to auxiliary arms 3, with the opening of each cup 4 being directed upwardly and the edge of the same being higher than the arm 1 by a dimension H, as shown in FIG. 3. By this difference in height H, the impact between the workpiece and the arm is expected to be lightened.

The vacuum cup effectively accommodates the workpiece by providing a suction force when the plane portion of the workpiece contacts the cup. For the purpose of facilitating detachment of the work piece, it may be convenient to provide an air hole 5 at a suitable position in the vacuum cup wall. Even with such an air hole 5, the vacuum cup provides enough suction to be able to inhibit instantaneous motion such as sliding of the workpiece at the time of impact between the workpiece and the cup, while the hole promotes detachment of the workpiece from the cup when the workpiece is to be taken out.

Figure 4:
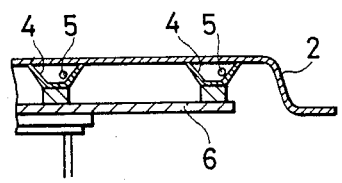
FIG. 4 is a sectional side elevation of a second embodiment of the present invention.

FIG. 4 shows another embodiment of the present invention wherein a support member 6 is provided that has no arm portions. Vacuum cups 4 are placed on the support members 6. In this case, the vacuum cups have the roles of a shock absorber and arms for supporting the workpiece. It may be preferable to use the apparatus according to the second embodiment when the workpiece 2 is comparatively light in weight. In this embodiment, it would be also effective to use rubber rollers in combination with the suction cups by substituting them for arms.

According to the above arrangement of the lifting apparatus, when the arm 1 is inserted under the workpiece 2 so as to lift the same, the upper edge portion of the cup 4 whose top (upper end) protrudes beyond the upper surface of the arm 1 by a distance of H contacts and supports the workpiece 2 while it yields to a small degree. The air hole 5 acts so as to release inside air when the cup is compressed. Since the workpiece 2 is accommodated by the cups 4 which are yielding in this state, it is prevented from sliding and shifting from its right place. Thus the position of the workpiece 2 is stabilized. A similar effect may be provided during the step of removing. Since the cup 4 acts as a shock absorber, a direct impact between the workpiece 2 and the arm portion of the lifting apparatus due to the weight and the inertia of the workpiece 2 can be avoided so as to prevent accidents which may result in deformation of the workpiece 2.

What is claimed is:

1. An apparatus for use in loading and unloading workpieces from a press machine comprising:

an arm for supporting a workpiece;

an auxiliary arm formed so as to be adjacent to and integral with said supporting arm; and a vacuum cup provided on said auxiliary arm; an upper portion of said vacuum cup protruding beyond an upper surface of said support arm, said vacuum cup having an air hole defined therein which communicates an inner space of said cup with the atmosphere outside the cup, whereby sufficient suction is provided by said cup to prevent a workpiece from slipping with respect to said support arm during loading or unloading of a press machine, while permitting easy detachment of said cup from said workpiece after the workpiece has been loaded onto or unloaded from the press machine.

2. An apparatus according to claim 1 wherein a lower portion of said vacuum cup extending below said upper surface of said supporting arm, to an extent whereby a workpiece sitting on said support arm does not crush said vacuum cup.

3. An apparatus according to claim 1 wherein an inner surface of said vacuum cup is continuous except for said air hole defined therein communicating with the atmosphere outside the cup.

4. An apparatus for use in loading and unloading workpieces from a press machine comprising:

an arm for supporting a work piece; and a vacuum cup provided on said arm; an upper portion of said vacuum cup protruding beyond an upper surface of said arm, said vacuum cup having an air hole defined therein which communicates an inner space of said cup with the atmosphere outside the cup, whereby sufficient suction is provided by said cup to prevent a workpiece from slipping with respect to said support arm during loading or unloading of a press machine, while permitting easy detachment of said cup from said workpiece after the workpiece has been loaded onto or unloaded from the press machine.

5. An apparatus according to claim 4 wherein an inner surface of said vacuum cap is continuous with the exception of said air hole that is defined therein.

* * * * *